United States Patent [19]

Harvey

[11] 4,299,466
[45] Nov. 10, 1981

[54] APPARATUS FOR RESTORING LOST DATA TO A MEMORY DEVICE

[75] Inventor: Donald M. Harvey, Webster, N.Y.

[73] Assignee: Eastman Kodak Company, Rochester, N.Y.

[21] Appl. No.: 146,721

[22] Filed: May 5, 1980

[51] Int. Cl.³ .................. G03B 1/60; G03B 17/36
[52] U.S. Cl. .................................. 354/173; 354/214; 354/217; 354/23 D
[58] Field of Search ............... 354/173, 21, 23 D, 171, 354/214, 215, 217, 218; 352/92

[56] References Cited

U.S. PATENT DOCUMENTS

| | | | |
|---|---|---|---|
| 3,444,795 | 5/1969 | Nerwin | 354/21 |
| 4,021,828 | 5/1977 | Jura | 354/217 |
| 4,174,888 | 11/1979 | Hunn | 352/170 |

FOREIGN PATENT DOCUMENTS 2833550 2/1979 Fed. Rep. of Germany .

Primary Examiner—Lawrence R. Franklin
Assistant Examiner—S. D. Schreyer
Attorney, Agent, or Firm—Roger A. Fields

[57] ABSTRACT

In a photographic camera, an electrically powered memory device stores data obtained by sensing detectable means on a filmstrip, but loses stored data upon a power diminution below a minimum level necessary for memory retention. When electrical power is resumed above such minimum level to a predetermined higher level, a film drive is operated to rewind the filmstrip at least until the detectable means previously sensed during film advance have been returned past the sensing device. Then, the film drive is operated to re-advance the filmstrip substantially the same distance it was rewound. During re-advance, the sensing device again senses the detectable means to restore lost data to the memory device.

11 Claims, 14 Drawing Figures

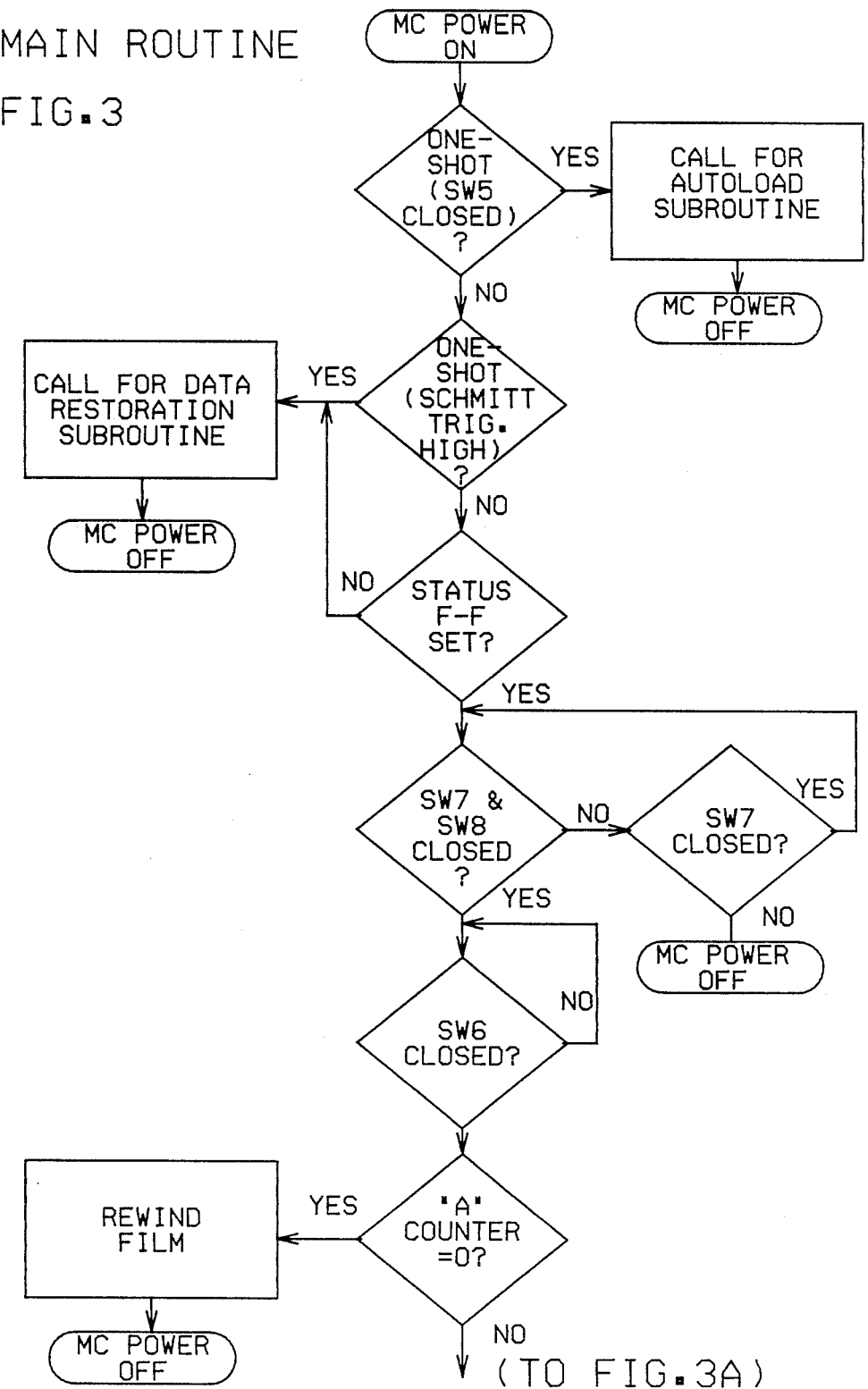

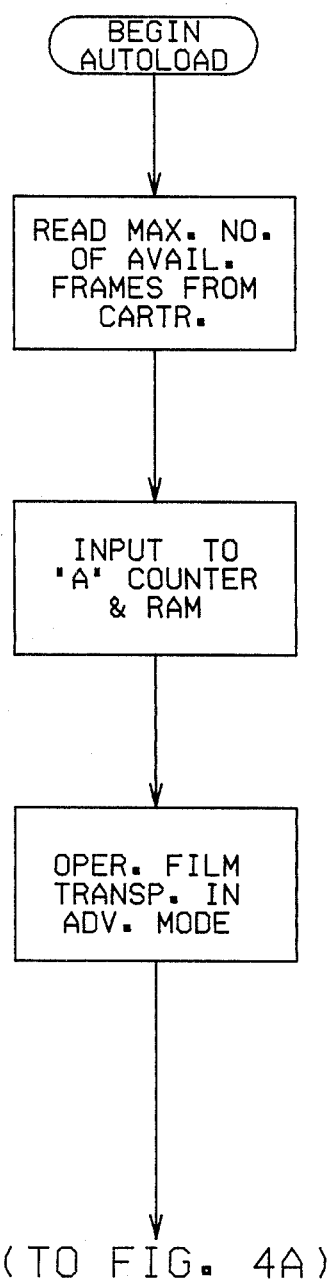

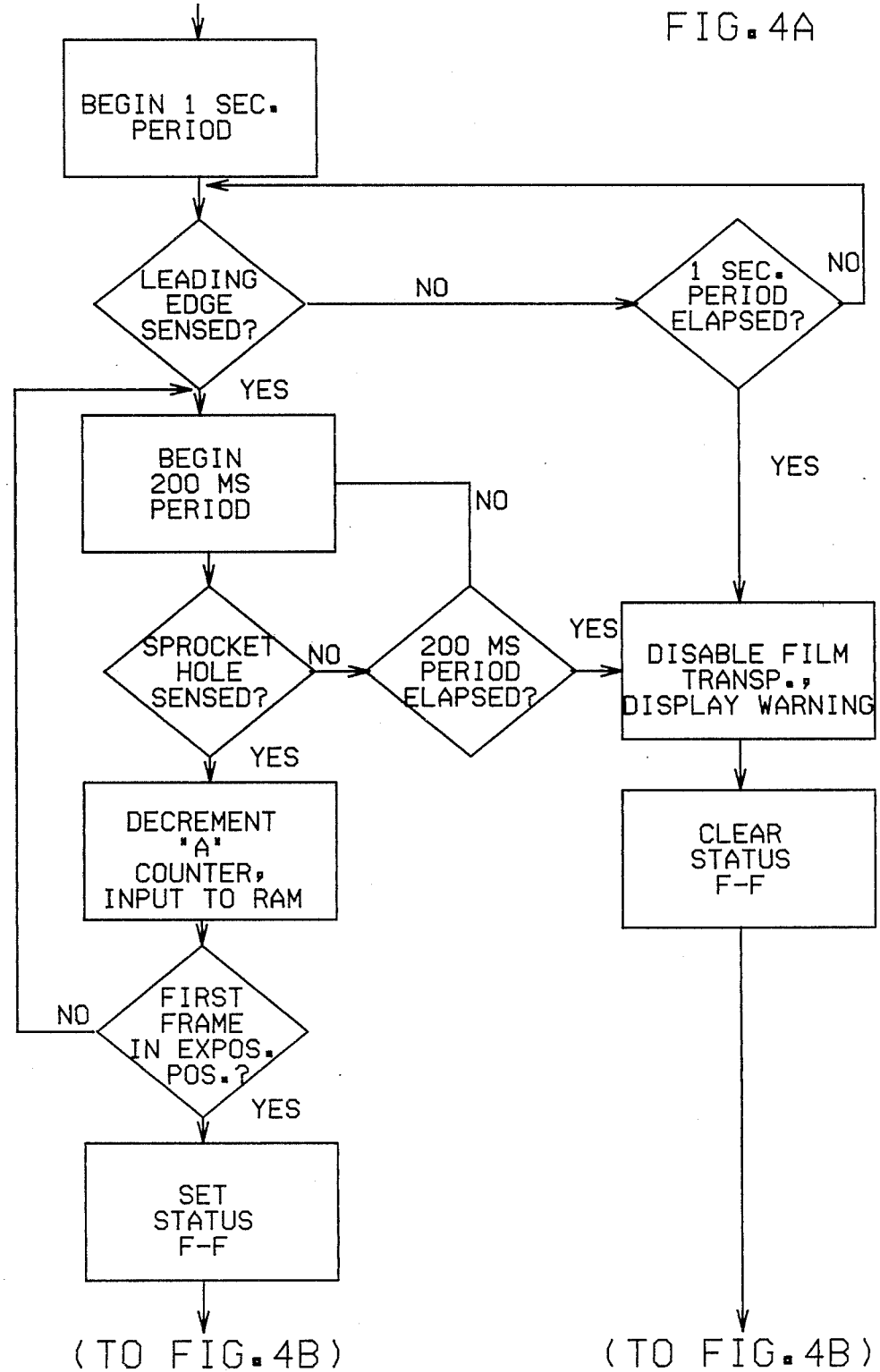

DATA RESTORATION SUBROUTINE (TO FIG. 5A)

INTERRUPT ROUTINE

MAIN ROUTINE (TO FIG.3)

INTERRUPT ROUTINE

APPARATUS FOR RESTORING LOST DATA TO A MEMORY DEVICE

BACKGROUND OF THE INVENTION

1. Field of the Invention

The present invention generally relates to apparatus for restoring lost data to an electrically powered memory device in a photographic camera. More particularly, the invention relates to apparatus for restoring film-related data that is lost from storage in the memory device because of a power diminution or a power interruption resulting, for example, from a weak or dead battery in the camera.

2. Description of the Prior Art

It is known to provide an electrically powered memory device in modern cameras, especially 35 mm cameras. The memory device may be used as a counter which monitors the movement of a filmstrip in the camera. For example, in U.S. Pat. No. 4,021,828, granted Feb. 3, 1975, after the camera is loaded with fresh film, the counter is set to a value corresponding to the total number of frames on the filmstrip, e.g. 12, 24 or 36 frames. A sprocket wheel engaging successive sprocket holes in the filmstrip makes one rotation each time the filmstrip is advanced a single frame length. A differentiating circuit, coupled with the sprocket wheel, applies an output pulse to the counter each time the sprocket wheel makes one rotation. The output pulses are counted up or down with respect to the value set in the counter to enable an indicator to display the number of exposed or unexposed frames.

German Offenlegungsschrift No. 28 33 550, published Feb. 15, 1979, discloses a pair of electrodes arranged on opposite sides of the path of successive sprocket holes in a filmstrip advanced in the camera. A pulse generating circuit, coupled with the electrodes, applies an output pulse to a counter each time the electrodes detect a sprocket hole. The count of output pulses is used to control film metering and, following advance of the filmstrip a frame length, to display the number of frames still available for exposure.

In the '828 patent and the '550 Offenlegungsschrift, the various battery powered elements, other than the counter which stores the pulse count, may be disconnected from the battery during the time interval between successive film winding operations to prevent wasteful consumption of the battery. The counter is not disconnected from electrical power because it has a volatile memory.

Known cameras that include a counter having a volatile memory typically suffer certain disadvantages. For example, in the '828 patent and the '550 Offenlegungsschrift, should the battery source of electrical power become weak or die, causing the pulse count to be lost, the lost count is not restored upon replacing the used battery with a fresh one. If the battery failure occurs before all of the available film frames have been exposed, then, after replacing the used battery with a fresh one and exposing the next available film frame, the pulse count will be incorrect. An improper pulse count will, of course, result in the indicator displaying an incorrect number and may affect other camera operations, such as film metering, which depend upon the pulse count.

SUMMARY OF THE INVENTION

The above-described problems associated with prior art electrically powered memory devices, such as film counters, are believed solved by the present invention. Specifically, according to the present invention, there is provided means for restoring film-related data to an electrically powered volatile memory in a camera after stored data is lost because of a power diminution or interruption resulting, for example, from a weak or dead battery.

In keeping with the teachings of the present invention, there is provided in a photographic camera of the type having (a) drive means for advancing and rewinding a filmstrip and (b) electrically powered memory means which stores data sensed during film advance, but loses stored data upon a power diminution below a minimum level for memory retention, the improvement comprising:

means, effective upon the resumption of electrical power above such minimum level to a predetermined higher level, for first operating the drive means to rewind the filmstrip at least to the location of the filmstrip at which data was first sensed before the power diminution, and for then re-advancing the filmstrip sufficiently to restore lost data to the memory means.

According to a preferred embodiment of the present invention, the means for operating the drive means to first rewind and then re-advance the film strip (to restore lost data to the memory) is automatically responsive to the resumption of electrical power above the minimum level for memory retention to the predetermined higher level. As a result, replacing a weak or dead battery in the camera with a fresh one will automatically restore lost data to the memory. Moreover, should the battery voltage drop below the minimum level for memory retention, for example when the battery becomes quite cold, resumption of the battery voltage to the predetermined level above such minimum level, after the battery becomes warmer, automatically restores lost data to the memory.

In the preferred embodiment, the camera is of the type having (a) means for sensing a plurality of detectable means, such as code markings, code perforations, or sprocket holes along a filmstrip, (b) electrically powered drive means for advancing and rewinding the filmstrip past the sensing means, and (c) electrically powered memory means which stores data obtained by sensing the detectable means, but loses stored data upon a power diminution below the minimum level for memory retention; and the improvement comprises:

means for disabling the drive means upon said power diminution; and means, automatically responsive to the resumption of electrical power above the minimum level to the predetermined level, for first operating the drive means to rewind the filmstrip at least until the detectable means sensed during film advance have been returned past the sensing means, and for then operating the drive means to re-advance the filmstrip substantially the same distance it was rewound, whereby the sensing means senses the detectable means during re-advance to restore lost data to the memory.

Still other aspects of the invention and more specific features will become apparent to those skilled in the art from the following description of the preferred embodiment considered together with the accompanying drawings.

BRIEF DESCRIPTION OF THE DRAWINGS

FIGS. 3 and 3A are a flow chart illustrating a general sequence or main routine for a computer which controls operation of the camera in FIG. 1;

FIGS. 4, 4A, and 4B are a flow chart illustrating a film autoload subroutine for the computer;

DESCRIPTION OF THE PREFERRED EMBODIMENT

A data restoration device according to a preferred embodiment of the present invention is incorporated in a 35 mm still picture camera. Because such cameras are well known, this description will be directed in particular to elements forming part of or cooperating directly with apparatus embodying the present invention. It is to be understood, however, that camera elements not specifically shown or described may take various forms known to those skilled in the camera art.

Figure 1:
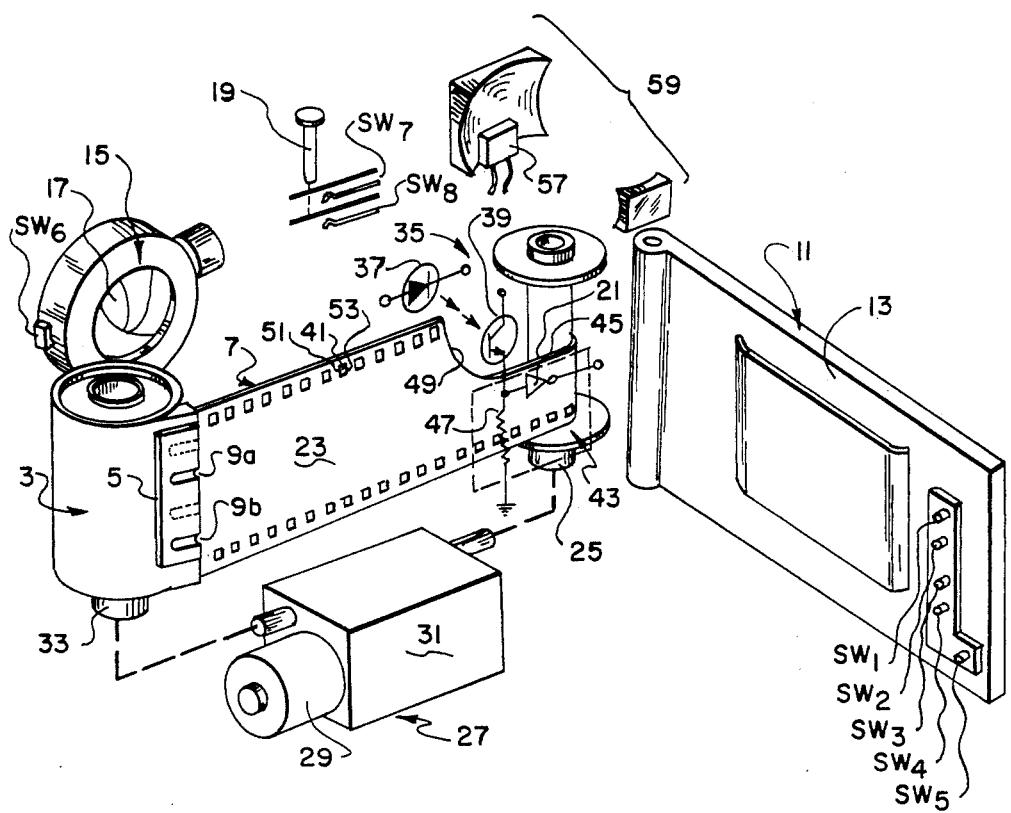
FIG. 1 is a perspective view of various elements of a still picture camera including a data restoration device constructed in accordance with a preferred embodiment of the present invention.

Referring now to FIG. 1, there are shown various elements of a 35 mm still picture camera provided with a data restoration device in accordance with the present invention. The camera in FIG. 1 is battery operated and has a chamber defined within its housing for receiving a 35 mm film cartridge 3. The cartridge 3 is a conventional one, except for a binary coded area 5 having a code notch located in at least one of four different code positions aligned in the coded area. The presence or absence of a code notch in each of the four possible code positions defines a four-bit binary number (in 0's and 1's) which represents a photographic characteristic of a filmstrip 7 in the cartridge 3. Further details of the binary code arrangement, as well as the photographic characteristics that may be represented, are disclosed in U.S. Pat. No. 3,444,795. In FIG. 1, the cartridge 3 is shown as having two code notches 9a and 9b in the code area 5. The presence of these code notches at two of the four possible code positions and the absence of a code notch at the two remaining code positions defines a four-bit binary number representing the maximum number of available film frames, for example 36 frames, on the filmstrip 7. A hinged back door 11 forming part of the camera housing is provided with four biased-open notch sensing switches SW1, SW2, SW3, and SW4, located on an interior face 13 of the back door. The four switches SW1–SW4 operate to detect the presence or absence of respective code notches in the four code positions in the coded area 5 of the cartridge 3. When the back door 11 is closed in FIG. 1, the two switches SW1 and SW3 are closed upon contact with the coded area 5 and the two switches SW2 and SW4 remain open (because they extend into the code notches 9a and 9b).

In FIG. 1, there is shown a biased-open switch SW5, located on the interior face 13 of the back door 11. The switch SW5 operates upon closing the back door 11 to detect whether a film cartridge is loaded in the camera. When the back door 11 is closed, the switch SW5 will be closed by contact with the film cartridge 3. If no film cartridge is present in the cartridge receiving chamber, the switch SW5 will remain open after the back door 11 is closed.

A conventional diaphragm shutter 15, shown in FIG. 1, may consist of a ring of three to five inter-leaving thin metal blades 17 that come together to form a diaphragm. The blades 17 may be located behind a picture-taking lens, not shown, to permit the use of interchangeable lenses. On completely depressing a shutter release 19 to an exposure position, the blades 17 swing outward, leaving a clear hole for light to pass through and onto a film frame on the filmstrip 7. At the termination of film exposure, the blades 17 close and the hole disappears, leaving an opaque diaphragm once again. Adjacent the blades 17, there is shown a biased-open switch SW6 for detecting whether the blades are open or closed. The switch SW6 is closed upon closing the blades 17 and re-opens upon opening the blades. The shutter release 19 is coupled with two normally open switches SW7 and SW8. When the shutter release 19 is only partially depressed to a standby position, in which the blades 17 remain closed, the switch SW7 is closed. However the switch SW8 remains open. In contrast, complete depression of the shutter release 19 to the exposure position, in which the blades 17 are temporarily opened, causes both switches SW7 and SW8 to close.

After the film cartridge 3 is loaded in the camera in FIG. 1, a reduced width leader tongue 21, forward of the film leader 23, is manually secured to a take-up spool 25. The take-up spool 25 is permanently rotatably mounted in a spool receiving chamber defined within the camera housing. A conventional motor-driven film transport 27 operates to advance the filmstrip 7 from the cartridge 3, across an exposure or imaging plane, and onto the take-up spool 25. When reversed, the film transport 27 operates to rewind the filmstrip 7 from the take-up spool 25 back into the cartridge 3. As is well known, the film transport 27 is coupled with the shutter release 19 to prevent unintended exposure of a film frame during film advance or film rewind and may be coupled with the diaphragm shutter 15 to re-tension or cock the blades 17 (for the next exposure) automatically during film advance. The film transport 27 is provided with a reversible-drive electric motor and a polarity control for motor reversal, shown schematically as 29, and with a transmission, shown schematically as 31 and coupled to the take-up spool 25 and to a shaft extension 33 of a supply spool within the cartridge 3. Although not shown, the transmission 31 includes a suitable gear train and respective advance and rewind clutches which permit the take-up spool or the supply spool to rotate freely as the other is positively driven.

Film advance and film rewind are monitored in the camera by a sprocket hole sensor 35, shown schematically in FIG. 1 as comprising a light-emitting diode (LED) 37 and a phototransistor 39. Details of such a sprocket hole sensor are disclosed in U.S. Pat. No. 4,174,888, though other designs such as a mechanical sensor or an electrical sensor may be used. The LED 37 and the phototransistor 39 are positioned in such a way that a beam of infrared light projected by the LED onto the phototransistor extends across the path of a row of successive sprocket holes 41 in the filmstrip 7. With such an arrangement, an output pulse may be generated in dependence on whether the projected light beam passes through a sprocket hole or is intercepted by an intervening film surface. In the preferred embodiment, the phototransistor 39 is coupled with an inverter circuit 43 comprising, for example, a NOT gate 45 and a fixed resistor 47, whereby a high signal is produced whenever the projected light beam falling on the phototransistor is intercepted by a film edge. Accordingly, during film advance in FIG. 1, the sprocket hole sensor 35 first operates to detect a leading edge 49 of the film leader 23 and then operates to detect respective trailing edges 51 of successive sprocket holes 41. During film rewind, the sprocket hole sensor operates to detect respective trailing edges 53 of the sprocket holes.

Figure 2:
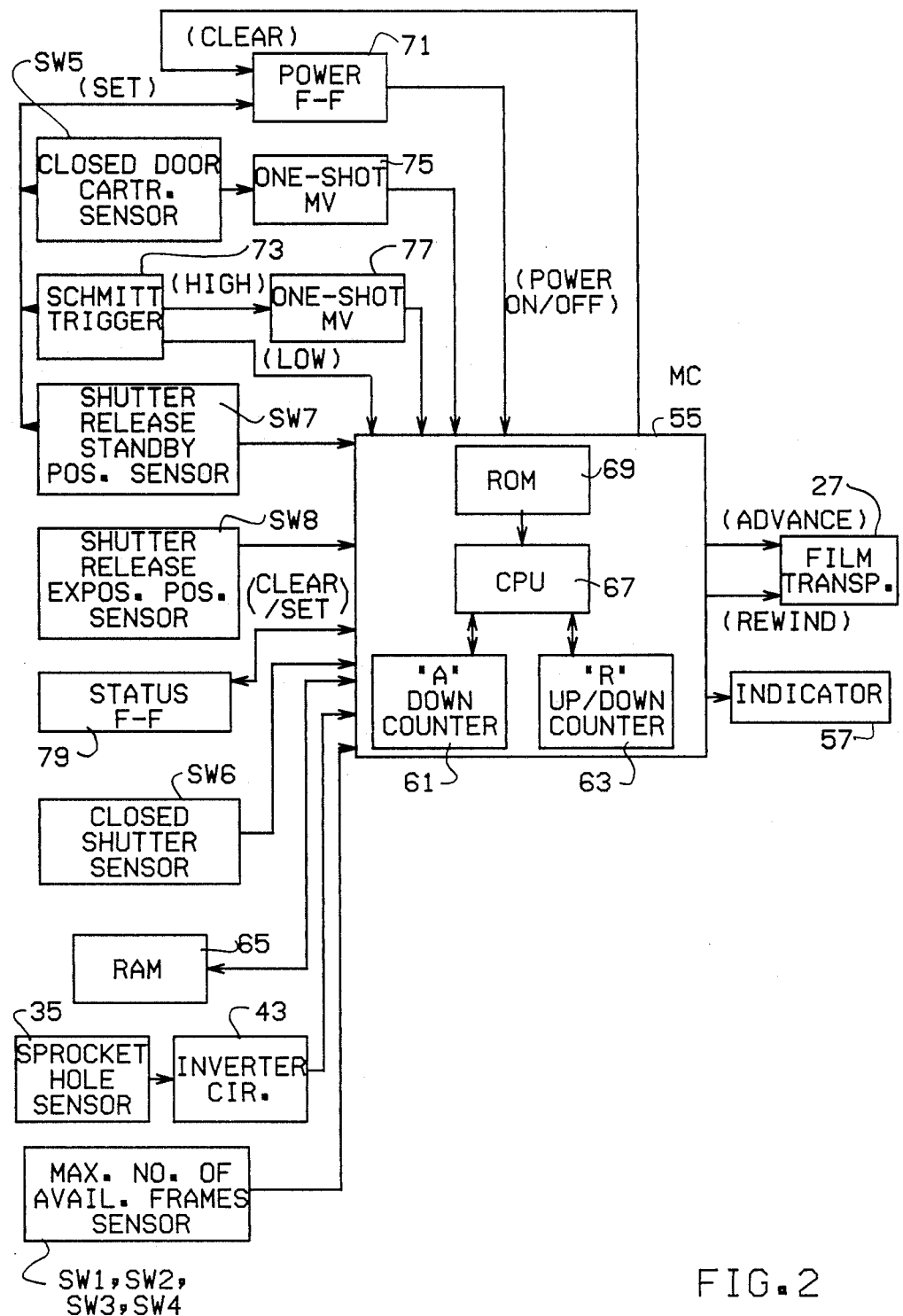
FIG. 2 is a schematic block diagram of electrical circuitry and computer hardware suitable for use with the camera depicted in FIG. 1.

Referring now to FIG. 2, as the filmstrip 7 is advanced or rewound in the camera, the resulting high signals are inputted from the sprocket hole sensor 35 and the inverter circuit 43 to a typical digital microcomputer (MC) 55. The MC 55 controls operation of the film transport 27 for film advance and film rewind and for metering the filmstrip 7 to advance successive film frames into an exposure position. The details of this operation are described below in connection with the flow charts in FIGS. 3-6. An indicator 57, located in a camera viewfinder 59 in FIG. 1, is coupled with the MC 55 to display the number of film frames available for exposure each time a film frame is advanced to the exposure position and to display a warning signal indicating a film break, a film jam, or disengagement of the leader tongue 21 of the filmstrip 7 from the take-up spool 25. The indicator 57 may be constructed of any suitable display means, such as liquid crystals or LED's. As depicted in FIG. 2, the MC 55 includes an "A" DOWN-counter 61 operable during film advance to count down respective high signals produced by the sprocket hole sensor 35 and the inverter circuit 43. Such count down in the "A" counter 61 begins from a value corresponding to the maximum number of film frames available on the filmstrip 7. This value is inputted to the MC 55 by the switches SW1-SW4 upon closing the back door 11 of the camera. An "R" UP DOWN-counter 63 in the MC 55 is operable during film rewind to count up the high signals from zero and is operable during film re-advance, following film rewind, to count down the high signals from the count obtained during film rewind. The details of such operations are described below in connection with the flow charts in FIGS. 3-5. The count of high signals in the "A" counter 61 and/or in the "R" counter 63 is stored in the form of binary numbers (0's or 1's) in a random-access memory (RAM) 65, coupled with the MC 55. Although not shown, the RAM 65 may itself perform the count functions, dispensing with the need for the "A" and "R" counters 61 and 62. The RAM 65 has a greater capacity than either the "A" counter 61 or the "R" counter 63, which allows other data read from film in the camera, such as film speed or film type, to be temporarily stored in the RAM. As in prior art devices, however, the data stored in the RAM (or for that matter, in the "A" and "R" counters) will be lost (a) upon a voltage diminution below a minimum level, such as 1.5 volts, necessary for memory retention or (b) upon a power cut-off, resulting, for example, from a weak or dead battery in the camera. A memory having this characteristic is commonly known as a volatile memory.

A central processing unit (CPU) 67 in the MC 55 receives data in the form of binary numbers and performs arithmetic operations on the data in accordance with previously stored instructions in a read-only memory (ROM) 69. The ROM 69 has a nonvolatile memory, whereby all stored data remains intact upon electrical power being discontinued to the MC 55. A power SR (set-reset) flip-flop 71 is coupled with the MC 55, the two switches SW5 and SW7, and with a Schmitt Trigger 73. The power flip-flop 71 has a set state in which electrical power from the battery is provided to the MC 55, and has a clear or reset state in which such electrical power is discontinued to the MC. The Schmitt Trigger 73 is a bistable (two-state) circuit which assumes a low state whenever the input voltage from the battery to the Schmitt Trigger drops below the minimum level, e.g. 1.5 volts, necessary to retain stored data in the RAM 55 and assumes a high state upon a voltage resumption above such minimum level to a working or predetermined level, e.g., 4 volts. The voltage resumption occurs, for example, when a weak or dead battery in the camera is replaced with a fresh one, or when a battery weakened by exposure to excessive cold resumes its working strength after it becomes warmer. When the Schmitt Trigger 73 assumes its high state upon the voltage resumption, or when either one of the switches SW5 or SW7 has just been closed by closing the back door 11 (after the film cartridge 3 is loaded in the camera) or by depressing the shutter release 19 to its standby position, respectively, a trigger pulse is applied to the power flip-flop 71. The trigger pulse causes the power flip-flop to assume its set state, whereupon, electrical power from the battery is provided to the MC. For purposes which will become apparent below in connection with a description of the flow chart in FIG. 3, the Schmitt Trigger 73 and the switch SW5 operate to inform the MC 55 by input pulses from respective one-shot (monostable) multivibrators (MV) 75 and 77 that electrical power provided to the MC resulted from the Schmitt Trigger assuming its high state or from the switch SW5 being closed. When the Schmitt Trigger 73 assumes its low state upon a voltage diminution below the minimum level for memory retention in the RAM 65, the MC 55 disables the film transport 27 and applies a trigger pulse to the power flip-flop 71. Such trigger pulse causes the power flip-flop to assume its clear state, whereupon, electrical power is discontinued to the MC. The MC will similarly apply the trigger pulse to the power flip-flop (to power off the MC) as the final step in the flow charts in FIGS. 3, 3A, and 6.

In FIG. 2, a status SR (set-reset) flip-flop 79, coupled with the MC 55, has a clear state indicating a film break, a film jam, or disengagement of the leader tongue 21 of the filmstrip 7 from the take-up spool 25, and has a set state indicating the nonoccurrence of such problems. The status flip-flop assumes either the clear state or the set state upon receiving respective trigger pulses from the MC.

Although not shown in FIG. 2, the switch SW5 and the one-shot MV 75, the Schmitt Trigger 73 and the one-shot MV 77, the switch SW7, the power flip-flop 71, the RAM 65, and the status flip-flop 79 are all coupled with the battery in the camera and can continue to operate even though electrical power is discontinued to the MC 55. The remaining elements, shown outside of the MC in FIG. 2, are disabled whenever electrical power is discontinued to the MC.

OPERATION

The operation of the camera depicted in FIGS. 1 and 2 is best understood by reviewing FIGS. 3-6, which are flow charts illustrating various routines and subroutines for the MC 55. Programming a computer is a skill well understood in the art. The following description is written to enable a programmer having ordinary skill in the art to prepare an appropriate program for the MC 55. The particular details of any such program would of course depend upon the architecture of the particular computer selected.

Main Routine

Figure 3A:
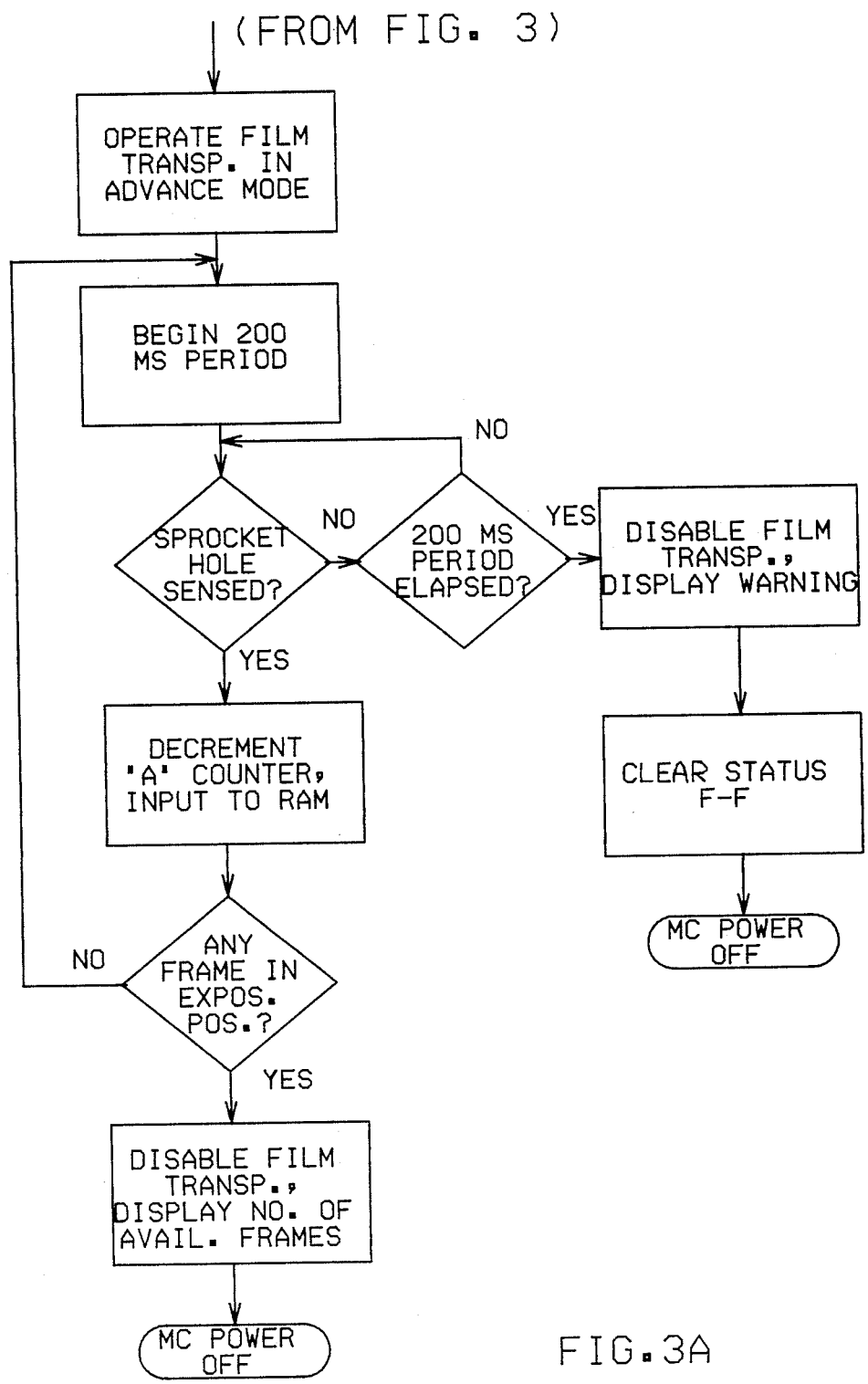

Referring now to FIGS. 3 and 3A, which are a flow chart of the main or general sequence routine for the MC 55, it will be recalled from the above description of FIG. 2 that the power flip-flop 71 will assume its set state to power on the MC upon any one of the following occurrences:

(1) When the switch SW5 is closed by contact with the film cartridge 3 upon closing the back door 11 of the camera;

(2) When the Schmitt Trigger 73 assumes its high state in response to a power resumption above the minimum level for memory retention in the RAM 65, to the predetermined level, e.g., 4 volts; and (3) When the switch SW7 is closed by depressing the shutter release 19 at least to its standby position.

Therefore, assuming the MC 55 is powered on in FIG. 3, the first decision in the main routine is: "has the switch SW5 just been closed (as evidenced by an input pulse from the one-shot MV 75 to the MC)?" If the answer is yes, an autoload subroutine is called for.

Autoload Subroutine

Figure 4B:
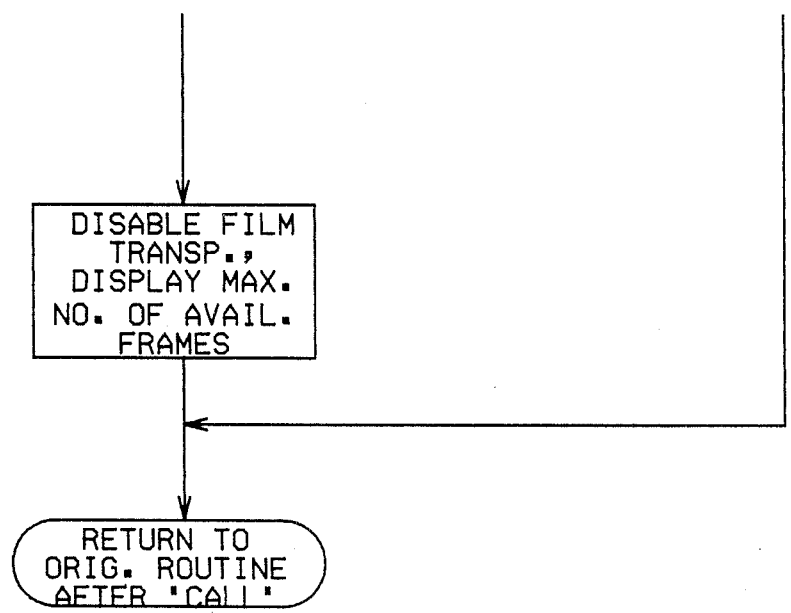

Referring now to FIGS. 4, 4A, and 4B, which are a flow chart of the autoload subroutine, the first step in FIG. 4 is to read the condition of the switches SW1–SW4 to determine the maximum number of film frames available in the film cartridge 3. The "A" counter 61 is set to a value in accordance with such maximum number and corresponding data is provided to the RAM 65. The film transport 27 is then operated in a film advance mode, initially to wind the reduced width leader tongue 21 of the filmstrip 7 onto the take-up spool 25. In FIG. 4A, a one second time period is begun upon film advance and a first decision is made: "has the sprocket hole sensor 35 detected the leading edge 49 of the film leader 23 within such one second period?" If the answer to the first decision is no, another decision is made: "has the one second time period elapsed?" If the answer to the other decision is no, the first decision is made again. If the answer to the other decision is yes, this indicates a film break, a film jam, or disengagement of the leader tongue 21 from the take-up spool 25. Therefore, the film transport 27 is disabled, a warning signal is displayed for one second or more in the indicator 57, and the MC 55 applies a trigger pulse to the status flip-flop 79, causing such flip-flop to assume its clear state (which indicates an outstanding problem relating to film advance). Then, in FIG. 4B, the final step orders return to the main routine, after the step in the main routine calling for the autoload subroutine. In the main routine in FIG. 3, the MC 55 applies a trigger pulse to the power flip-flop 71, which causes such flip-flop to assume its clear state, powering off the MC.

Referring back to the autoload subroutine in FIG. 4A, if the answer to the first decision regarding detection of the leading edge 49 of the film leader 23 is yes (as evidenced by a high signal from the sprocket hole sensor 35 and the inverter circuit 43), a 200 ms time period is begun and a new decision is made: "has the sprocket hole sensor 35 detected the trailing edge 51 of a sprocket hole 41 within such 200 ms time period?" If the answer to the new decision is no, another decision is made: "has the 200 ms time period elasped?" If the answer to the other decision is no, the decision regarding detection of the trailing edge 51 of a sprocket hole 41 is made again. If the answer to the other decision is yes, this indicates a film break or a film jam, whereupon, as described above, the film transport 27 is disabled, a warning signal is displayed by the indicator 57, the status flip-flop 79 assumes its clear state and, in the main routine, the MC 55 is powered off. If the answer to the decision regarding detection of the trailing edge 51 of a sprocket hole 41 is yes (as evidenced by a high signal from the sprocket hole sensor 35 and the inverter circuit 43), the "A" counter 61 is decremented (i.e., the high signal is counted down) and corresponding data is provided to the RAM 65. Then, the decision is made: "is the first film frame in an exposure position?" The answer to this decision is obtained first by interrogating the RAM 65 for data regarding the number of sprocket holes 41 advanced past the sprocket hole sensor 35 and then performing an arithmetic operation on the data to determine whether such number is of a value consistent with advance of the first frame to the exposure position. For example, with a 35 mm roll of film, the first frame will be in the exposure position after the first 24 sprocket holes have been detected. If the answer to the decision regarding the first film frame in the exposure position is no, the 200 ms time period is begun again. If the answer is yes, the MC 55 applies a trigger pulse to the status flip-flop 79, causing such flip-flop to assume its set state (which indicates the nonoccurrence of a problem relating to film advance). In FIG. 4B, the film transport 27 is disabled and, for one second or more, the indicator 57 displays the maximum number of film frames available in the cartridge 3. Then, the final step orders return to the main routine, after the step in the main routine calling for the autoload subroutine. In the main routine, the MC 55 is powered off.

Main Routine—continued

Referring back to the main routine in FIG. 3, if the answer to the first decision regarding closing of the switch SW5 is no, a second decision is made: "has the Schmitt Trigger 73 assumed its high state (as evidenced by an input pulse from the one-shot MV 77 to the MC 55)?" If the answer is yes, indicating the MC was powered on in response to a power resumption, a data restoration subroutine is called for.

Data Restoration Subroutine

Figure 5:
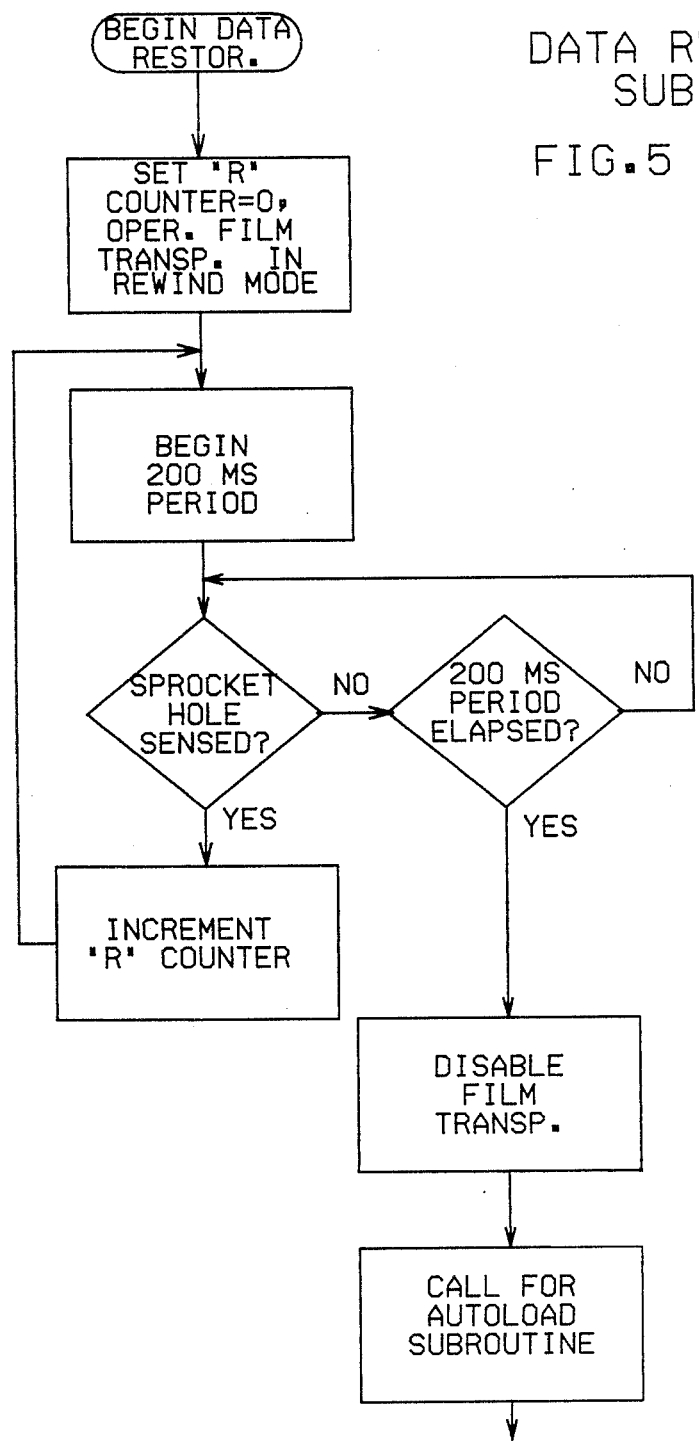
FIGS. 5, 5A, and 5B are a flow chart illustrating a data restoration subroutine for the computer.
Figure 5A:
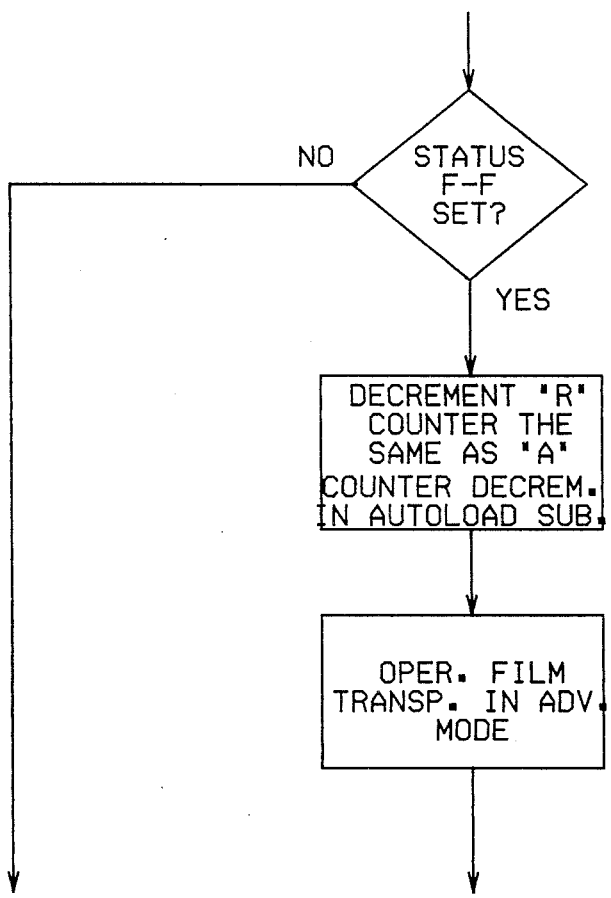
Figure 5B:
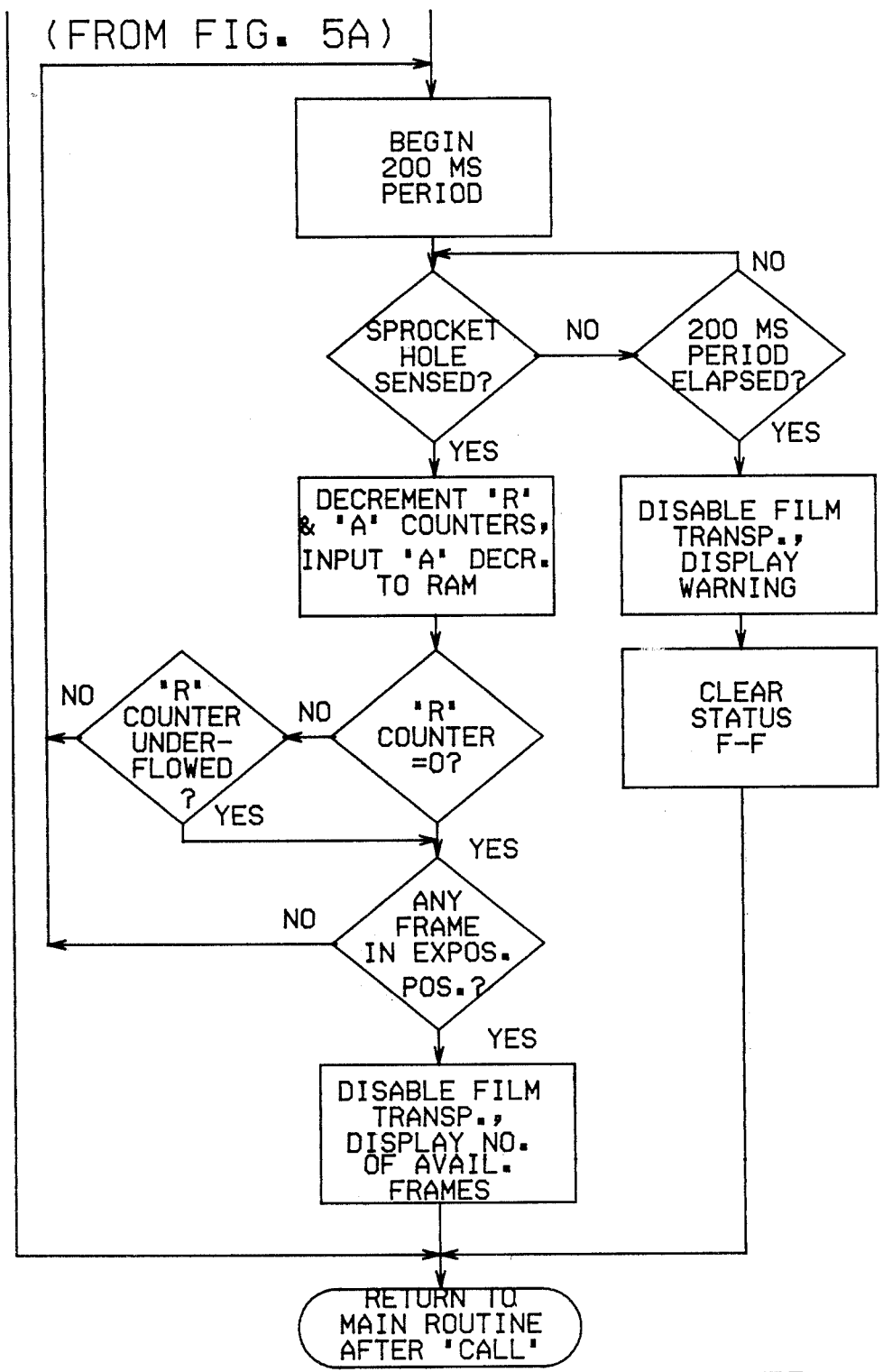

Referring now to FIGS. 5, 5A, and 5B, which are a flow chart of the data restoration subroutine, the first step in FIG. 5 is to set the "R" counter 63 to a value equivalent to zero and to operate the film transport 27 in the film rewind mode. Then, a 200 ms time period is begun and a first decision is made: "has the sprocket hole sensor 35 detected the trailing edge 53 of a sprocket hole 41 within such 200 ms period?38 If the answer is yes (as evidenced by a high signal from the sprocket hole sensor 35 and the inverter circuit 43), the "R" counter 63 is incremented (i.e., the high signal is counted up), and the 200 ms time period is begun again. If the answer to the first decision is no, another decision is made: "has the 200 ms time period elapsed?" If the answer to the other decision is no, the first decision is made again. If the answer to the other decision is yes, this normally indicates the filmstrip 7 has been rewound at least until the leading edge 49 of the film leader 23 is returned past the sprocket hole sensor 35. Otherwise, the yes decision indicates a film break or a film jam has occurred during such rewind. In either event, the film transport 27 is disabled and the autoload subroutine is called for. The autoload subroutine, as described above, first operates to re-advance the first film frame to the exposure position and then orders return to the data restoration subroutine, after the step in the data restoration subroutine calling for the autoload subroutine. In FIG. 5A, the next step in the data restoration subroutine is the decision: "is the status flip-flop 79 in its set state?" If the answer is no, i.e., the status flip-flop is in its clear state, this indicates an outstanding problem has occurred during the data restoration or autoload subroutines relating to film rewind or film re-advance, such as a film break or a film jam. Therefore, in FIG. 5B, the final step in the data restoration subroutine orders return to the main routine, after the step in the main routine calling for the data restoration subroutine. In the main routine, the MC 55 applies a trigger pulse to the power flip-flop 71 which causes such flip-flop to assume its clear state, powering off the MC. Referring back to the data restoration subroutine in FIG. 5A, if the answer to the decision regarding the state of the status flip-flop 79 is yes, i.e., the status flip-flop is in its set state (as ordered in the autoload subroutine to indicate the nonoccurrence of any problem relating to film movement), the "R" counter 63 is now decremented in accordance with the previous decrement of the "A" counter 61 in the autoload subroutine. This permits the "R" counter to take into account re-advance of the filmstrip 7 during the autoload subroutine. Then, the film transport 27 is operated in the film advance mode and, in FIG. 5B, a 200 ms time period is begun and a new decision is made: "has the sprocket hole detector 35 detected the trailing edge 51 of a sprocket hole 41 within such 200 ms time period?" If the answer to the new decision is no, another decision is made: "has the 200 ms time period elapsed?" If the answer to the other decision is no, the decision regarding detection of the trailing edge 51 is made again. If the answer to the other decision is yes, this indicates a film break or a film jam, whereupon, the film transport 27 is disabled, a warning signal is displayed for one second or more in the indicator 57, and the MC applies a trigger pulse to the status flip-flop 79 causing such flip-flop to assume its clear state (which indicates an outstanding problem relating to film re-advance). Then, the final step, as described above, orders return to the main routine, after the step in the main routine calling for the data restoration subroutine. In the main routine, the MC 55 is powered off. Referring back to the data restoration subroutine in FIG. 5B, if the answer to the decision regarding detection of the trailing edge 51 of a sprocket hole 41 is yes (as evidenced by a high signal from the sprocket hole sensor 35 and the inverter circuit 43), the "R" and "A" counters 61 and 63 are decremented (i.e., the high signal is counted down) and corresponding data in accordance with decrement of the "A" counter is provided to the RAM 65. Then, the decision is made: "is the "R" counter at a value equivalent to zero?" If the answer is no, another decision is made: "has the "R" counter underflowed?" If the answer to the other decision is no, i.e., the "R" counter is at a value greater than zero, the 200 ms time period is begun again. If the answer to the other decision or to the decision regarding the "R" counter being at a value equivalent to zero is yes, this indicates, respectively, that the filmstrip 7 first has been re-advanced to the same extent it was rewound and then it has been advanced beyond such extent, or the filmstrip merely has been re-advanced to the same extent it was rewound. In either even, the lost data (regarding the number of sprocket holes 41 initially advanced past the sprocket hole sensor 35) has been restored during film re-advance to the RAM 65. Therefore, the next decision is made: "is a film frame in the exposure position?" The answer to this decision, as described above, is obtained by interrogating the RAM 65 regarding the number of sprocket holes 41 advanced past the sprocket hole sensor 35 and depends upon the maximum number of film frames available in the film cartridge 3. For example, with a 35 mm roll of film, the first film frame will be in the exposure position after the first 24 sprocket holes have been detected and respective successive film frames will be in the exposure position each time 8 more sprocket holes have been detected. If the answer to the decision regarding a film frame in the exposure position is no, the 200 ms time period is begun again. If the answer is yes, the film transport 27 is disabled and, for one second or more, the indicator 57 displays the number of film frames available for exposure. Then, the final step orders return to the main routine, after the step in the main routine calling for the data restoration subroutine. In the main routine, the MC 55 is powered off.

Main Routine—continued

Referring back to the main routine in FIG. 3, if the answer to the second decision regarding the Schmitt Trigger 73 assuming its high state is no, this indicates that the MC 55 was powered on by depressing the shutter release 19 at least until the switch SW7 is closed. Then, a third decision is made: "is the status flip-flop 79 in its set state?" If the answer is no, i.e., the status filp-flop is in its clear state, this indicates an outstanding problem has occurred during film movement, such as a film break or a film jam, whereupon, the data restoration subroutine is called for to rewind as much of the filmstrip 7 as is possible back into the film cartridge 7 before opening the back door 11 of the camera. If the answer to the third decision regarding the state of the status flip-flop 79 is yes, i.e., the status filp-flop is in its set state (as ordered in the autoload subroutine), a fourth decision is made: "is the shutter release 19 depressed to the exposure position?", that is, "are switches SW7 and SW8 closed?" If the answer to the fourth decision is no, another decision is made: "is the shutter release 19 depressed only to the standby position?", that is, "is just the switch SW7 closed?" If the answer to the other decision is yes, the fourth decision is made again. If the answer to the other decision is no, indicating the shutter release 19 is no longer depressed, the MC 55 applies a trigger pulse to the power flip-flop 71, causing such flip-flop to assume its clear state, powering off the MC. If the answer to the fourth decision regarding depression of the shutter release to the exposure position is yes, another decision is made: "is the shutter 15 closed?", that is, "is the switch SW6 closed?" If the answer to the other decision is no, which indicates the exposure interval has not yet terminated, the other decision is made again. If the answer to the other decision is yes, which indicates the exposure interval has terminated, the next decision is made: "is the "A" counter 61 at a value equivalent to zero?" If the answer to such next decision is yes, which indicates the last film frame has been exposed, the filmstrip 7 is rewound back into the film cartridge 3 and the MC 55 is powered off, as described above. If the answer to such next decision is no, indicating the exposed film frame was not the last available frame, the film transport 27 is operated in the film advance mode and a 200 ms time period is begun, in FIG. 3A. Then, a new decision is made: "has the sprocket hole sensor 35 detected with trailing edge 51 of a sprocket hole 41 within such 200 ms time period?" If the answer to the new decision is no, another decision is made: "has the 200 ms time period elapsed?" If the answer to the other decision is no, the decision regarding detection of the trailing edge 51 of a sprocket hole 41 is made again. If the answer to the other decision is yes, this indicates a film break or a film jam, whereupon, the film transport 27 is disabled, the status flip-flop 71 assumes its clear state, and the MC 55 is powered off. If the answer to the decision regarding detection of the trailing edge 51 of the sprocket hole 41 is yes, the "A" counter 61 is decremented and corresponding data is provided to the RAM 65. Then, the decision is made: "is a film frame in the exposure position?" If the answer is no, the 200 ms time period is begun again. If the answer is yes, the film transport 27 is disabled and, for one second or more, the indicator 57 displays the number of film frames available for exposure. Then, the MC 55 is powered off.

Interrupt Routine

Figure 6:
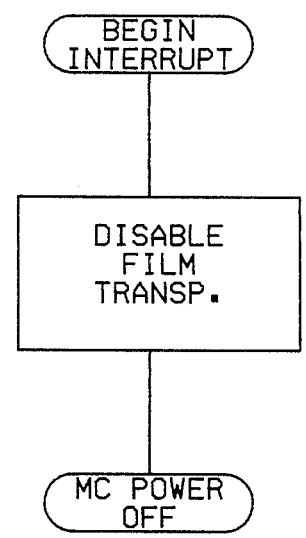
FIG. 6 is a flow chart illustrating an interrupt routine for the computer.

The interrupt routine, depicted as a flow chart in FIG. 6, operates to suspend the on-going routine or subroutine and is called for whenever the Schmitt Trigger 73 assumes its low state upon a power diminution below the minimum level for memory retention in the RAM 65. In the interrupt routine, the film transport 27 is disabled and the MC 55 applies a trigger pulse to the power flip-flop 71 which causes such flip-flop to assume its clear state, powering off the MC. At this time, the camera user should check the battery in the camera.

DESCRIPTION OF THE ALTERNATE EMBODIMENT

It will be recalled from the description of the preferred embodiment that the Schmitt Trigger 73 has two functions, namely:

(1) Whenever the Schmitt Trigger 73 assumes its low state upon a power diminution below the minimum level for memory retention in the RAM 65, the interrupt routine is called for to power off the MC 55.

(2) Whenever the Schmitt Trigger 73 assumes its high state upon a power resumption above the minimum level to the predetermined level, a trigger pulse is applied to the power flip-flop 71 to power on the MC 55, and an input pulse is provided by the one-shot MV 77 to the MC, causing the MC to initiate the data restoration subroutine.

Figure 7:
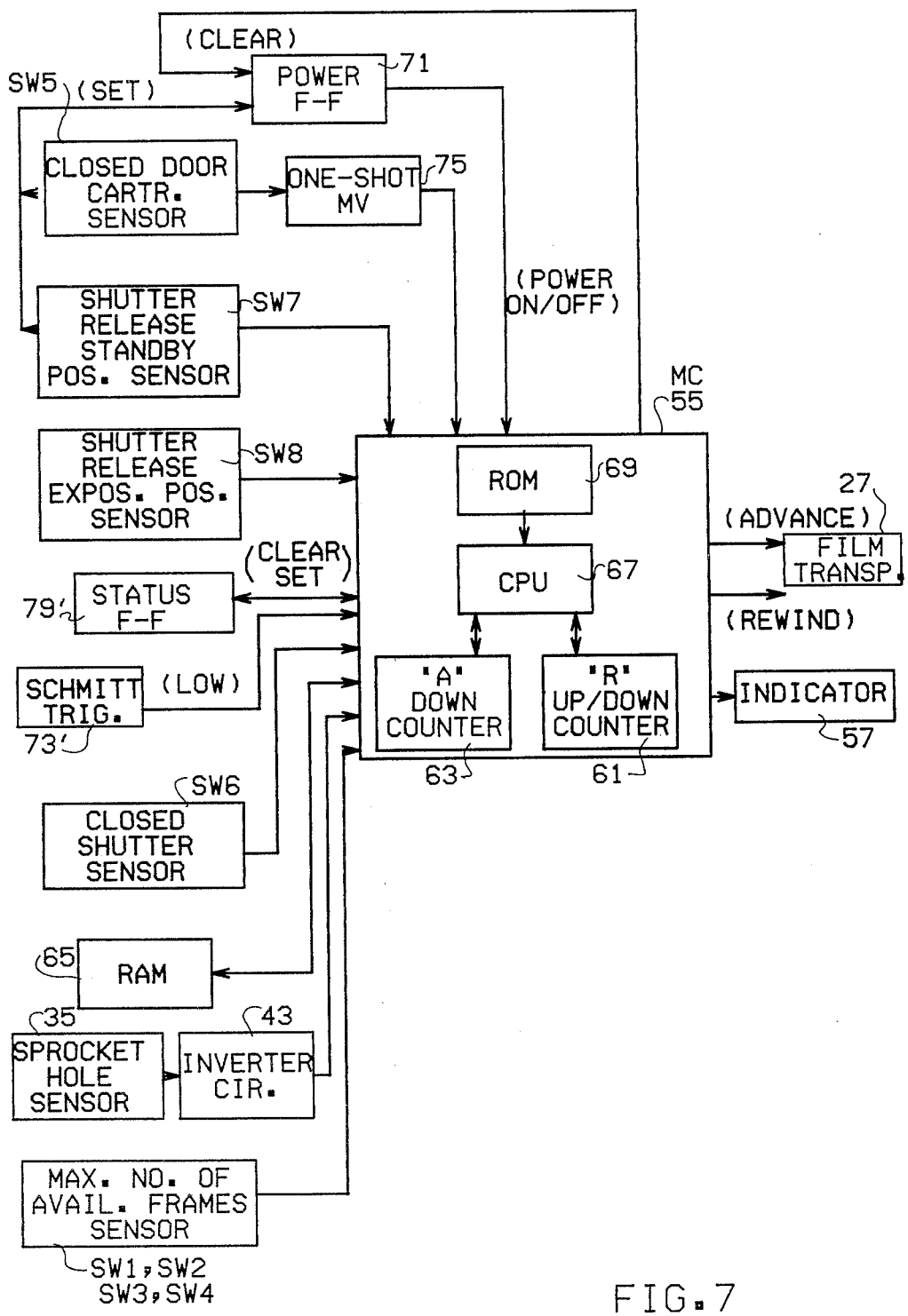
FIG. 7 is a schematic block diagram of electrical circuitry and computer hardware suitable for use with an alternate embodiment of the present invention.

The alternate embodiment in FIG. 7 differs from the preferred embodiment in FIG. 2 in two respects. First, the Schmitt Trigger 73' only serves (in its low state) to call for the interrupt routine. The Schmitt Trigger 73', in its high state, has no affect on the MC 55 or on the power flip-flop 71. In FIG. 7, the Schmitt Trigger 73' is not coupled with the MC 55 via a one-shot MV and is not coupled with the power flip-flop 71 (as in FIG. 2). Second, the status SR (set-reset) flip-flop 79' has a preferential state, which is its clear state. Such clear state is assumed by the status flip-flop 79' upon a power resumption, following a power cut-off.

Interrupt Routine

Figure 9:
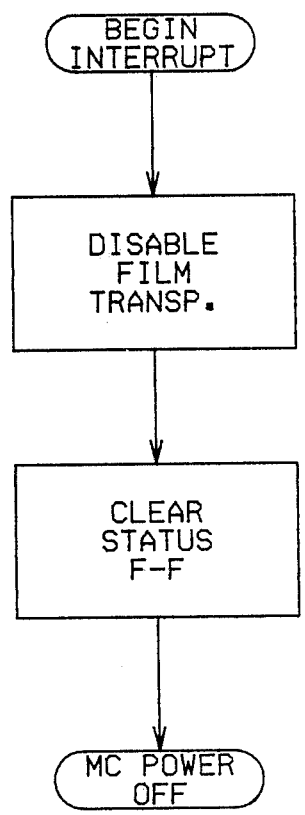
FIG. 9 is a flow chart illustrating an interrupt routine for such computer.

The interrupt routine, depicted as a flow chart in FIG. 9, is called for whenever the Schmitt Trigger 73' assumes its low state upon a power diminution below the minimum level for memory retention in the RAM 65. In the interrupt routine, the MC 55 disables the film transport 27. Then, the MC 55 applies a trigger pulse to the status flip-flop 79', causing such flip-flop to assume its clear state, which indicates the power diminution. In the final step, the MC 55 applies a trigger pulse to the power flip-flop 71 which causes such flip-flop to assume its clear state, powering off the MC.

Main Routine

In the alternate embodiment, the power flip-flop 71 will assume its set state to power on the MC 55 upon either of the following occurrences:

(1) When the switch SW5 is closed by contact with the film cartridge 3 upon closing the back door 11 of the camera; and (2) When the switch SW7 is closed by depressing the shutter release 19 at least two to its standby position.

Figure 8:
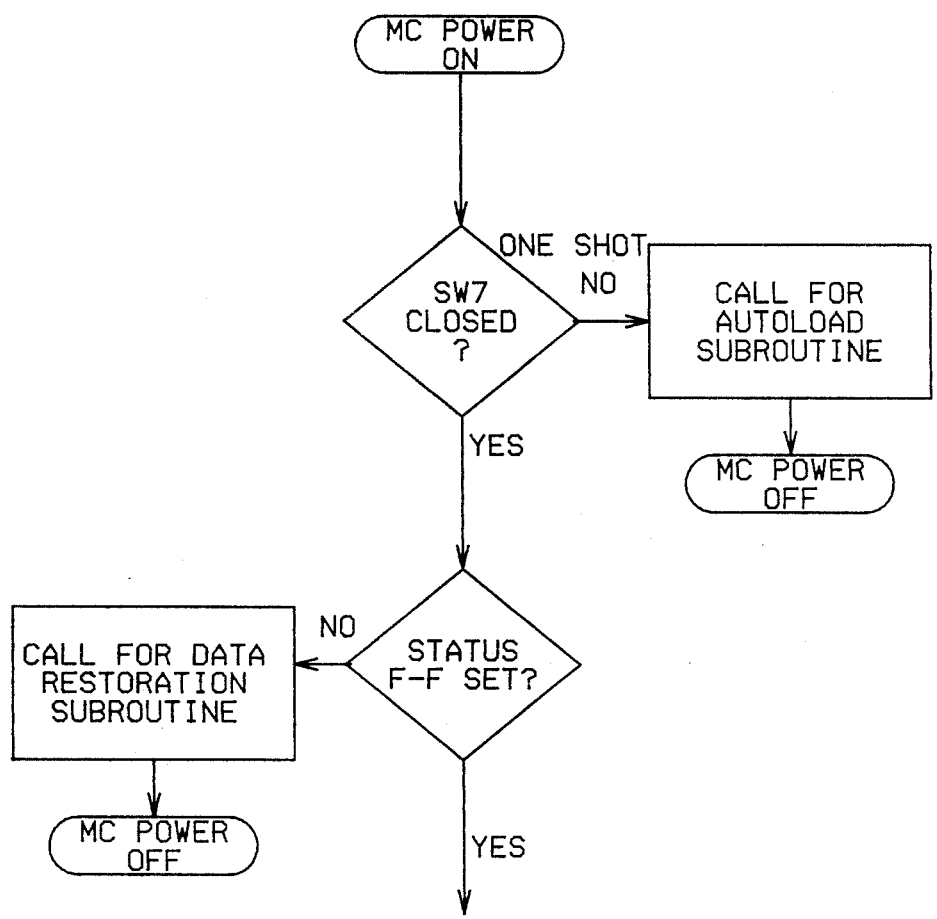
FIG. 8 is a flow chart illustrating a general sequence or main routine for a computer in the alternate embodiment.

In FIG. 8, which is a flow chart of the main routine, assuming the MC 55 is powered on, the first decision is: "is the shutter release 19 depressed at least to the standby position?", that is, "is the switch SW7 closed?". If the answer to the first decision is no, this indicates the MC 55 was powered on by closing the switch SW5 (as evidenced by an input pulse from the one-shot MV 75 to the MC). Therefore, the autoload subroutine is called for. If the answer to the first decision is yes, a second decision is made: "is the status flip-flop 79' in its set state?" If the answer to the second decision is no, i.e., the status flip-flop is in its clear state, this indicates an outstanding problem has occurred during film movement, such as a film break or a film jam, or otherwise there has been a power resumption following a power diminution below the minimum level for memory retention in the RAM 65 or following a power cut-off. In either event, the data restoration subroutine is called for. If the answer to the second decision is yes, the main routine for the alternate embodiment proceeds exactly as the main routine, in FIG. 3, for the preferred embodiment.

The present invention has been described in detail with particular reference to a preferred embodiment and to an alternate embodiment, but it will be understood that other variations and modifications can be affected within the spirit and scope of the invention.

I claim:

1. In a photographic camera of the type having (a) drive means for advancing and rewinding a filmstrip and (b) electrically powered memory means which stores data sensed during film advance, but loses stored data upon a power diminution below a minimum level for memory retention, the improvement comprising:

means, effective upon the resumption of electrical power above said minimum level to a predetermined level, for first operating said drive means to rewind the filmstrip at least to the location of the filmstrip at which lost data was first sensed before said power diminution and for then re-advancing the filmstrip a sufficient distance to restore lost data to said memory means.

2. The improvement as recited in said claim 1, wherein said operating means is automatically responsive to the resumption of electrical power to said predetermined level to operate said drive means for film rewind.

3. In a photographic camera of the type having (a) drive means for advancing and rewinding a filmstrip and (b) electrically powered memory means which stores data sensed during film advance, but loses stored data upon a power diminution below a minimum level for memory retention, the improvement comprising:

means for disabling said drive means upon said power diminution; and means, effective upon the resumption of electrical power above said minimum level to a predetermined level, for first operating said drive means to rewind the filmstrip at least to the location of the filmstrip at which lost data was first sensed before said power diminution and for then re-advancing the filmstrip at least substantially the same distance it was rewound to restore lost data to said memory means.

4. In a photographic camera of the type having (a) drive means for advancing and rewinding a filmstrip and (b) electrically powered memory means which stores data sensed during film advance, but loses stored data upon a power diminution below a minimum level for memory retention, the improvement comprising:

a trigger circuit, assuming a stable state upon the resumption of electrical power above said minimum level to a predetermined level;

control means, responsive to an input signal, for first operating said drive means to rewind the filmstrip at least to the location of the filmstrip at which lost data was first sensed before said power diminution and for then re-advancing the filmstrip at least substantially the same distance it was rewound to restore lost data to said memory means; and means, coupled with said trigger circuit and said control means, for providing said input signal to said control means whenever said trigger circuit assumes said stable state.

5. In a photographic camera of the type having (a) means for sensing a plurality of detectable means along a filmstrip, (b) electrically powered drive means for moving the filmstrip past said sensing means, and (c) electrically powered memory means which stores data obtained by sensing the detectable means, but loses stored data upon a power diminution below a minimum level for memory retention, the improvement comprising:

means for disabling said drive means upon said power diminution; and means, effective upon the resumption of electrical power above said minimum level to a predetermined level, for operating said drive means to again move a film section, containing the detectable means from which lost data was derived, past said sensing means, whereby said sensing means re-senses said detectable means to restore lost data to said memory means.

6. The improvement as recited in claim 5, wherein said operating means is automatically responsive to the resumption of electrical power to said predetermined level to operate said drive means for film rewind.

7. In a photographic camera of the type having (a) means for sensing a plurality of detectable means along a filmstrip, (b) electrically powered drive means for advancing and rewinding the filmstrip past said sensing means, and (c) electrically powered memory means which stores data obtained by sensing the detectable means, but loses stored data upon a power diminution below a minimum level for memory retention, the improvement comprising:

means for disabling said drive means upon said power diminution; and means, effective upon the resumption of electrical power above said minimum level to a predetermined level, for first operating said drive means to rewind the filmstrip at least until the detectable means sensed during film advance have been returned past said sensing means and for then operating said drive means to re-advance the filmstrip substantially to the same extent it was rewound, whereby said sensing means senses said detectable means during re-advance to restore lost data to said memory means.

8. In a photographic camera of the type having (a) means for sensing a plurality of detectable means along a filmstrip, (b) electrically powered drive means for advancing and rewinding the filmstrip past said sensing means, and (c) electrically powered memory means which stores data obtained by sensing the detectable means, but loses stored data upon a power diminution below a minimum level for memory retention, the improvement comprising:

means, responsive to the resumption of electrical power above said minimum level to a predetermined level, for operating said drive means to rewind the filmstrip and for counting respective detectable means sensed during rewind, at least until the detectable means first sensed during film advance have been returned past said sensing means, and for operating said drive means to re-advance the filmstrip and for counting respective detectable means re-advanced past said sensing means, only until the same number of detectable means are counted during re-advance as during rewind, whereby said sensing means senses the detectable means during re-advance to restore lost data to said memory means.

9. The improvement as recited in claim 8, wherein said operating means changes operation of said drive means for film rewind to film re-advance after said sensing means does not sense any detectable means returning past it for a given time period.

10. In a photographic camera of the type having (a) means for sensing a plurality of detectable means along a filmstrip, (b) electrically powered drive means for advancing and rewinding the filmstrip past said sensing means, and (c) electrically powered memory means which stores data obtained by sensing the detectable means, but loses stored data upon a power diminution below a minimum level for memory retention, the improvement comprising:

circuit means, triggered by the resumption of electrical power above said minimum level to a predetermined level, for indicating the previous occurrence of said power diminution;

means, responsive to triggering of said circuit means, for first operating said drive means to rewind the filmstrip at least until the detectable means sensed during film advance have been returned past said sensing means and for then operating said drive means to re-advance the filmstrip substantially the same distance it was rewound, whereby said sensing means will sense said detectable means during re-advance to restore lost data to said memory means.

11. In a photographic camera of the type having (a) means for sensing a plurality of detectable means along a filmstrip, (b) electrically powered drive means for moving the filmstrip past said sensing means, and (c) electrically powered memory means which stores data obtained by sensing the detectable means, but loses stored data upon a power diminution below a minimum level for memory retention, the improvement comprising:

means, automatically responsive to the resumption of electrical power above said minimum level to a predetermined higher level, for operating said drive means to again move a film section, containing the detectable means from which lost data was derived, past said sensing means, whereby said sensing means re-senses said detectable means to restore lost data to said memory means.

* * * * *

UNITED STATES PATENT OFFICE
CERTIFICATE OF CORRECTION

PATENT NO. : 4,299,466
DATED : November 10, 1981
INVENTOR(S) : Donald M. Harvey

It is certified that error appears in the above-identified patent and that said Letters Patent are hereby corrected as shown below:

Column 14, line 53, delete "for" and insert --from-- in its place.

Signed and Sealed this

Nineteenth Day of January 1982

[SEAL]

Attest:

GERALD J. MOSSINGHOFF

Attesting Officer     Commissioner of Patents and Trademarks